US010104675B2

(12) United States Patent
Skarp et al.

(10) Patent No.: US 10,104,675 B2
(45) Date of Patent: Oct. 16, 2018

(54) PROVIDING WIRELESS LOCAL AREA NETWORK CAPACITY (71) Applicants: CLOUDSTREET OY, Helsinki (FI); MIKKELIN PUHELIN OYJ, Vantaa (FI)

(72) Inventors: Mika Skarp, Espoo (FI); Sami Nippula, Veikkola (FI); Sami Tiainen, Mikkeli (FI)

(73) Assignee: CLOUDSTREET OY, Helsinki (FI)

( * ) Notice: Subject to any disclaimer, the term of this patent is extended or adjusted under 35 U.S.C. 154(b) by 0 days.

(21) Appl. No.: 14/916,253

(22) PCT Filed: Oct. 6, 2014

(86) PCT No.: PCT/FI2014/050758
§ 371 (c)(1),
(2) Date: Mar. 3, 2016

(87) PCT Pub. No.: WO2015/049426
PCT Pub. Date: Apr. 9, 2015

(65) Prior Publication Data
US 2016/0198484 A1    Jul. 7, 2016

(30) Foreign Application Priority Data

Oct. 4, 2013    (FI) .................................... 20135994

(51) Int. Cl.
*H04W 4/00* (2018.01)
*H04W 72/08* (2009.01)
(Continued)

(52) U.S. Cl.
CPC ......... *H04W 72/087* (2013.01); *H04W 28/16* (2013.01); *H04W 28/20* (2013.01);
(Continued)

(58) Field of Classification Search
CPC ... H04W 72/087; H04W 72/10; H04W 28/16; H04W 28/20; H04W 28/22; H04W 84/12
(Continued)

(56) References Cited

U.S. PATENT DOCUMENTS 7,043,225 B1 *  5/2006  Patel ....................... H04L 12/14
                                                                455/404.2
2006/0268767 A1   11/2006  Sato et al.
(Continued)

FOREIGN PATENT DOCUMENTS

EP          1667358 A1    6/2006

OTHER PUBLICATIONS

International Search Report & Written Opinion dated Apr. 13, 2015 corresponding to International Patent Application No. PCT/FI2014/050758.
(Continued)

Primary Examiner — Peter Cheng
(74) Attorney, Agent, or Firm — Squire Patton Boggs (US) LLP (57) ABSTRACT An apparatus and method for providing a wireless local area network resource, comprising receiving, by a server, an end user request for a resource of a wireless local area network, said request identifying duration and capacity requested by an end user, and providing the requested resource for the end user by the server, wherein a subnetwork within said wireless local area network is provided for the sole use of the end user, said subnetwork providing said requested capacity.

17 Claims, 4 Drawing Sheets (51) Int. Cl.
  *H04W 28/16* (2009.01)
  *H04W 28/20* (2009.01)
  *H04W 72/10* (2009.01)
  *H04W 28/22* (2009.01)
  *H04W 84/12* (2009.01)

(52) U.S. Cl.
  CPC ............ *H04W 72/10* (2013.01); *H04W 28/22* (2013.01); *H04W 84/12* (2013.01)

(58) Field of Classification Search
  USPC ........................................................ 370/329
  See application file for complete search history.

(56) References Cited

U.S. PATENT DOCUMENTS

| | | |
|---|---|---|
| 2007/0153732 A1 | 7/2007 | Yao |
| 2008/0068991 A1* | 3/2008 | Ponauswamy ........ H04W 28/24 370/230 |
| 2010/0003975 A1 | 1/2010 | Barankanira et al. |
| 2011/0106952 A1* | 5/2011 | Doppler ............ H04W 72/0406 709/226 |
| 2011/0167478 A1* | 7/2011 | Krishnaswamy ....... H04L 47/10 726/4 |
| 2012/0269061 A1* | 10/2012 | Kekki ................... H04W 28/24 370/230 |
| 2013/0217359 A1* | 8/2013 | Cherian ................ G06F 15/177 455/411 |

OTHER PUBLICATIONS

International Preliminary Report on Patentability dated Sep. 9, 2015 corresponding to International Patent Application No. PCT/FI2014/050758.

Anand Balachandran et al.: "Wireless Hotspots: Current Challenges and Future Directions," Mobile Networks and Applications, Kluwer Academic Publishers, vol. 10, No. 3, Jun. 1, 2005, pp. 265-274, XP019213668.

* cited by examiner

PROVIDING WIRELESS LOCAL AREA NETWORK CAPACITY

FIELD OF THE INVENTION

The present invention generally relates to providing wireless local area network capacity for end users.

BACKGROUND OF THE INVENTION

In places like airports and similar, wireless local area network (WLAN, Wi-Fi) capacity is provided to end users by means of public WLAN networks. The WLAN resources are shared using best effort principle, which means that in congested networks the actual capacity experienced by the end user might be very low.

SUMMARY

According to a first example aspect of the invention there is provided a method for providing a wireless local area network resource, comprising:

offering a resource of a wireless local area network to an end user, receiving, by a server, an end user request for a resource of a wireless local area network selected by the end user, said request identifying duration and capacity requested by the end user; and providing a subnetwork within said wireless local area network for the sole use of the end user, said subnetwork providing said requested capacity.

According to an alternative example aspect of the invention there is provided a method for providing a wireless local area network resource, comprising:

receiving, by a server, an end user request for a resource of a wireless local area network, said request identifying duration and capacity requested by an end user; and providing the requested resource for the end user by the server, wherein said providing comprises providing a subnetwork within said wireless local area network for the sole use of the end user, said subnetwork providing said requested capacity.

The server may be a web server. The server may reside in an IP network. The wireless local area network may be an open (public) WLAN network.

In certain example embodiments, the method comprises providing the end user with network identification information and security information of the subnetwork.

In certain example embodiments, the method comprises providing the end user with an SSID (service set identifier) and/or a virtual ID (identifier) of the subnetwork. In certain example embodiments, the SSID represents network identification information. In certain example embodiments, the virtual ID represents network identification information. The virtual ID can be used as an alternative to or in addition to the SSID.

In certain example embodiments, the IEEE802.1Q standard (or its successor) is used to create virtual networks and virtual identification. Accordingly, in certain example embodiments, a VLAN (virtual local area network) identifier (VID) of IEEE802.1Q standard (or its successor) or a mac-address is used as a virtual ID or as a basis of creating such a virtual ID.

In certain example embodiments, the method comprises: providing the end user with security details of the subnetwork. The term security details can comprise the identification information (SSID, service set identifier) and security information (security key or keys) of the subnetwork.

Accordingly, in certain example embodiments, the method comprises:

providing the end user with an SSID and security key of the subnetwork.

In certain example embodiments, the method comprises said server negotiating with the end user about available guaranteed network capacity.

In certain example embodiments, the method comprises: setting the quality of service value of the subnetwork higher in priority compared to the quality of service value of best effort traffic in the remaining wireless local area network.

In certain example embodiments, said request additionally identifies a desired location.

In certain example embodiments, the method comprises: providing the end user with a guaranteed capacity at an agreed geographical area.

In certain example embodiments, the method comprises: providing a part of the total capacity of an access point or a part of the total capacity of a set of access points for a dedicated use of the end user. The subnetwork thus formed may be a dedicated subnetwork identified by its own SSID.

In certain example embodiments, the method comprises: sending a request to the wireless local area network for creating the subnetwork. The request may be sent by the server to a WLAN controller or similar that operates the WLAN network concerned.

In certain example embodiments, the method comprises: providing an automatic configuration of an end user device, by a downloadable configurator, to access the subnetwork.

In certain example embodiments, the method comprises identifying the WLAN resources available to be sold to end users, receiving an end user request for a WLAN resource, said request identifying duration, location and capacity requested, sending a request for creating a sub WLAN network fulfilling the request, and providing an SSID and security keys to the end user to enable the end user to access said sub WLAN network.

In certain example embodiments, the method logic resides in the server, but the actual creation of subnetworks occurs in a WLAN controller.

In certain example embodiments, the method comprises providing a connection for an end user via a WLAN network, automatically configure the subnetwork, and establishing a new connection via the subnetwork with the aid of a downloaded configurator.

In certain example embodiments, the method comprises offering to the end user alternatives from which he can select a time period (e.g., day, week or month), geographical locations (e.g., by using a map) and a capacity (e.g., 2 Mb/s, 5 Mb/s, 10 Mb/s).

In certain example embodiments, the subnetwork is created beforehand (so the SSID and security keys are ready when the end user orders them).

According to a second example aspect of the invention there is provided an apparatus for providing a wireless local area network resource, comprising:

offering means configured to offer a resource of a wireless local area network to an end user, receiving means configured to receive an end user request for a resource of a wireless local area network selected by the end user, said request identifying duration and capacity requested by an end user; and configuration means configured to provide the requested resource for the end user, wherein said providing comprises providing a subnetwork within said wireless local area network for the sole use of the end user, said subnetwork providing said requested capacity.

According to an alternative example aspect of the invention there is provided an apparatus for providing a wireless local area network resource, comprising:

receiving means configured to receive an end user request for a resource of a wireless local area network, said request identifying duration and capacity requested by an end user; and configuration means configured to provide the requested resource for the end user, wherein said providing comprises providing a subnetwork within said wireless local area network for the sole use of the end user, said subnetwork providing said requested capacity.

The apparatus may be a server. The server may be a server configured to operate in an IP network. The receiving means may be implemented by an interface. In certain example embodiments, the interface offers to the end user alternatives from which he can select a time period (e.g., day, week or month), geographical locations (e.g., by using a map) and a capacity (e.g., 2 Mb/s, 5 Mb/s, 10 Mb/s).

The configuration means may be implemented by a processor.

In certain example embodiments, the configuration means are configured to provide the end user with security details of the subnetwork.

In certain example embodiments, the apparatus comprises:

negotiating means for negotiating with the end user about available guaranteed network capacity.

In certain example embodiments, the configuration means are configured to set the quality of service value of the subnetwork higher in priority compared to the quality of service value of best effort traffic in the remaining wireless local area network.

In certain example embodiments, the configuration means are configured to provide a part of the total capacity of an access point or a part of the total capacity of a set of access points for a dedicated use of the end user.

In certain example embodiments, the apparatus comprises:

sending means configured to send a request to the wireless local area network for creating the subnetwork. The sending means may be implemented by an interface. The request is sent to a WLAN controller or similar that operates the WLAN network concerned.

In certain example embodiments, the configuration means are configured to provide an automatic configuration of an end user device, by a downloadable configurator, to access the subnetwork. In certain example embodiments, the apparatus comprises means configured to upload the configurator to end user equipment.

In certain example embodiments, the apparatus comprises:

a memory for storing information about WLAN resources available to be sold to end users. In certain example embodiments, the memory stores also pre-created subnetwork security details (SSID and security keys).

In certain example embodiments, the apparatus comprises an interface configured to provide an SSID and security keys of the subnetwork for the end user to enable the end user to access the subnetwork.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well. Any appropriate combinations of the embodiments may be formed.

BRIEF DESCRIPTION OF THE DRAWINGS

The invention will now be described, by way of example only, with reference to the accompanying drawings, in which.

DETAILED DESCRIPTION

Figure 1:
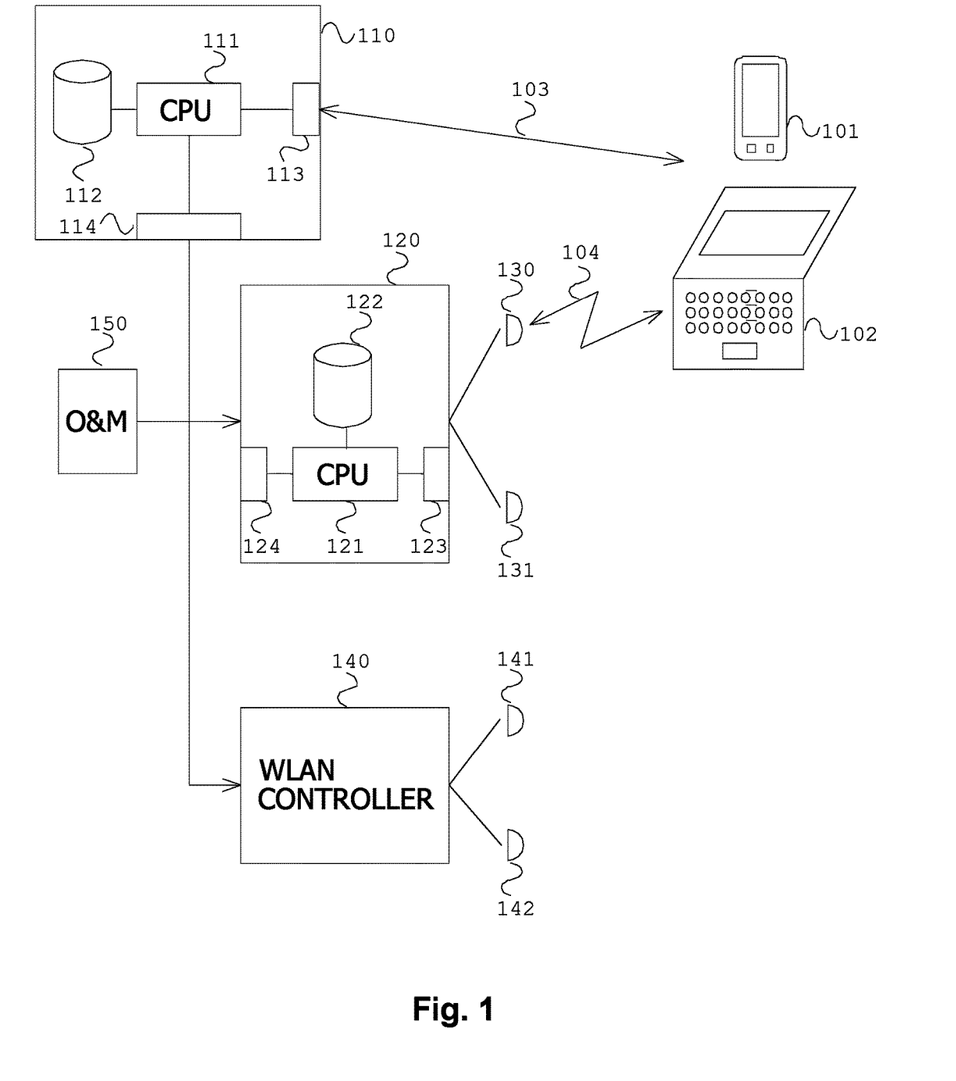
FIG. 1 shows a general framework for implementing an example embodiment.

FIG. 1 shows a general framework of a system for implementing an example embodiment for providing, or selling, a wireless local area network resource for an end user. The end user has end user equipment, which is a communication device, such as a laptop computer 102, a tablet computer or a mobile phone, for example, a smart phone 101.

At the network side, the system comprises a server 110 that manages resource allocation of at least one WLAN network. The server 110 is operated by a service provider. FIG. 1 shows a WLAN controller 120 of a first WLAN network. WLAN networks comprise at least one access point. In this example embodiment, the first WLAN network comprises a first access point 130 and a second access point 131 that provide wireless connectivity for end users. FIG. 1 further shows a WLAN controller 140 of a second WLAN network having corresponding access points 141 and 142. The coverage areas of the first and second WLAN networks may be overlapping. The system also comprises an operation and maintenance interface 150 to configure both the server 110 and the WLAN controllers 120,140.

The server 110 comprises a first interface 113 for communicating with the user equipment 101,102 over a connection 103. The connection 103 may be implemented via a cellular network or the internet. In yet another implementation, the connection 103 may be implemented via a WLAN network, possibly even said first or second WLAN network.

The server 110 comprises a second interface 114 for communicating with WLAN networks, more specifically with WLAN controllers 120 and/or 140. The second interface 114 may be a specific interface or it may be implemented, for example, via the internet. In a specific embodiment, the first interface 113 and the second interface 114 are the same.

The server 110 comprises a memory 112 and a processing unit 111 that controls the operation of the server 110 based on computer programs stored in the memory 112.

The first WLAN controller 120 comprises a first interface 123 towards access points 130, 131 that operate under the first WLAN controller 120.

The first WLAN controller 120 comprises a second interface 124 towards the server 110. The second interface 124 may be, for example, an SNMP management interface. In a specific embodiment, the second interface 124 may be implemented via the internet.

The first WLAN controller 120 comprises a memory 122 and a processing unit 121 that controls the operation of the first WLAN controller 120 based on computer programs stored in the memory 122.

The second WLAN controller 140 may have parts corresponding to the parts 121-124 of the first WLAN controller 120.

According to an example embodiment, the server 110 receives from the end user equipment 101 or 102 over the connection 103 an end user request for a WLAN resource. The request identifies a duration and capacity requested by the end user. In the example shown in FIG. 1, the end user requests a WLAN resource of the first WLAN network operated by the first WLAN controller 120. The server 110 provides the requested resource for the end user (end user equipment). The providing comprises providing a subnetwork within the requested WLAN network for the sole, or dedicated, use of the end user, the subnetwork providing the requested capacity. This may be implemented by allocating a part of the capacity of an access point or a part of the capacity of a set of access points to form a dedicated subnetwork with its own identification information (SSID, service set identifier, virtual ID) and security information (security key or keys, such as a WEP or WPA key). In the example shown in FIG. 1, a part of the capacity of the access point 130 under the WLAN controller 120 has been allocated to the dedicated use of the end user equipment 102. In other words, there has been created a dedicated subnetwork providing a dedicated connection 104 between the end user equipment 102 and the access point 130.

The end user request mentioned in the foregoing that is received by the server 110 can be sent from the end user equipment 102 with which he/she intends to use the dedicated connection 104 or from another end user equipment, such as the end user equipment 101. For example user can use a mobile phone 101 to access server 110 via internet and get the details he uses to activate the connection 104 for his laptop 102.

Although in FIG. 1 the dedicated connection 104 has been only implemented via the access point 130, in alternative embodiments, the same subnetwork can be additionally configured for another access point, for example the access point 131 under the same WLAN controller 120, or access points 141 and 142 operated by the second WLAN controller 140.

The server 110 has the overall control of the system. The server 110 communicates with the WLAN controllers 120 and 140 under it. And, it controls and maintains network information about subnetworks, such as their SSIDs, virtual IDs etc. in the memory 112. In one example embodiment, the IEEE802.1Q standard is used to create virtual networks and virtual identification according the IEEE802.1Q. For example, a VLAN identifier (VID) or mac-address is used as a virtual ID or as a basis of creating such a virtual ID.

The system described in the foregoing allows some of the resources of a WLAN access point or group of access points to be allocated to a dedicated subnetwork or subnetworks. In certain example embodiments, these separately allocated subnetworks are offered to the end users via an easy-to-access interface, with a promise that the same subnetwork/resource will not be used by anyone else. End users can buy, via a web interface or the like provided by the server, agreed WLAN capacity, e.g., 2 Mbps, on an agreed geographical area, that is, for certain access points, for a certain time period. When the end user has paid, the system creates a subnetwork, or the subnetwork can already have been created beforehand, sets the QoS parameters to guarantee the agreed WLAN capacity for said subnetwork and provides the end user with identification information (SSID, virtual ID, etc.) and security keys to access the subnetwork. In practice, by setting the QoS parameters is here meant, for example, setting the quality of service value of the subnetwork higher in priority compared to the quality of service value of best effort traffic in the remaining WLAN network (s), if the capacity of the WLAN network(s) has been shared between open best effort network(s) and subnetwork(s) with agreed QoS.

In one exemplary embodiment a public WLAN network with capacity of 100M uplink and 100M downlink is created and a specific SSID identifier is allocated or created to identify it. This 100M/100M capacity is further divided to e.g. ten 10M/10M virtual LAN (VLAN) each identified by own virtual ID, for example VLAN Identifier (VID). This virtual ID is then used to identify the capacity bought by the end user as explained later.

Figure 2:
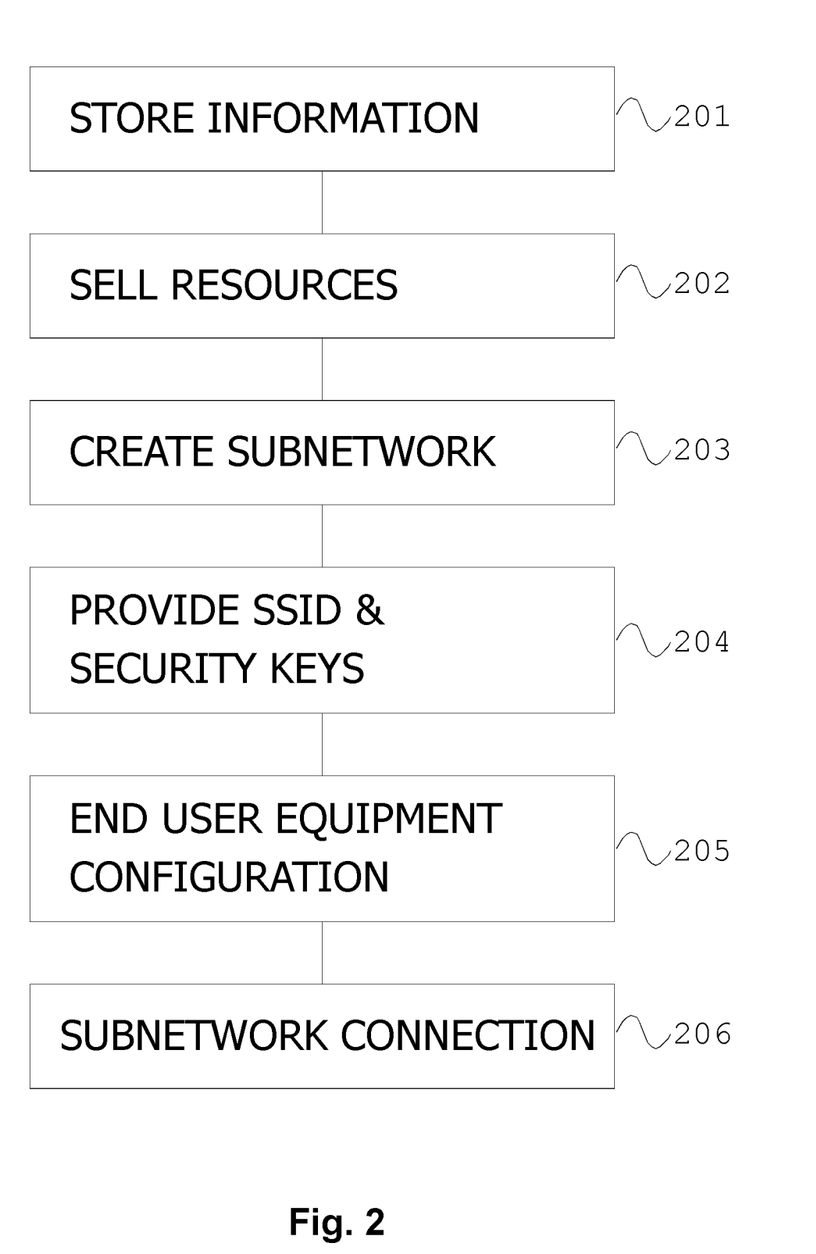
FIG. 2 shows a method for providing a wireless local area network resource in accordance with an example embodiment.

FIG. 2 shows a flow chart illustrating a method for providing a WLAN resource in accordance with a more detailed example embodiment. The server 110 stores in the memory 112 information on WLAN resources that it can sell to end users (step 201). This information can comprise information on available capacity of different WLAN controllers and/or WLAN access points operating under them. The information can be obtained from WLAN network operators, via for example the O&M interface 150 or WLAN controllers concerned.

In step 202, the end user connects a web page or the like provided by the server and selects a WLAN resource that he/she wants to buy.

In step 203, the dedicated subnetwork is created. In certain example embodiments, the server sends a request to generate the subnetwork to the WLAN controller concerned. In certain alternative embodiments, the subnetworks have been generated beforehand, for example, as part of step 201. In those embodiments the end user is simply mapped to at least one beforehand generated resource. The subnetwork identification information (SSID, virtual ID) and security information (security key or keys) to access the subnetwork are created in step 203, or have been created beforehand depending on the embodiment.

The subnetwork identification information and security information is provided to the end user in step 204. The providing step 204 can be implemented, for example, by giving the information via the web page to the end user, sending the information via email and/or via an SMS or similar.

Once the end user equipment receives the information, the end user equipment is configured to access the subnetwork in step 205, for example, the end user can manually configure or copy the provided details to the laptop 102.

Finally a connection is established via the subnetwork in step 206.

Figure 3:
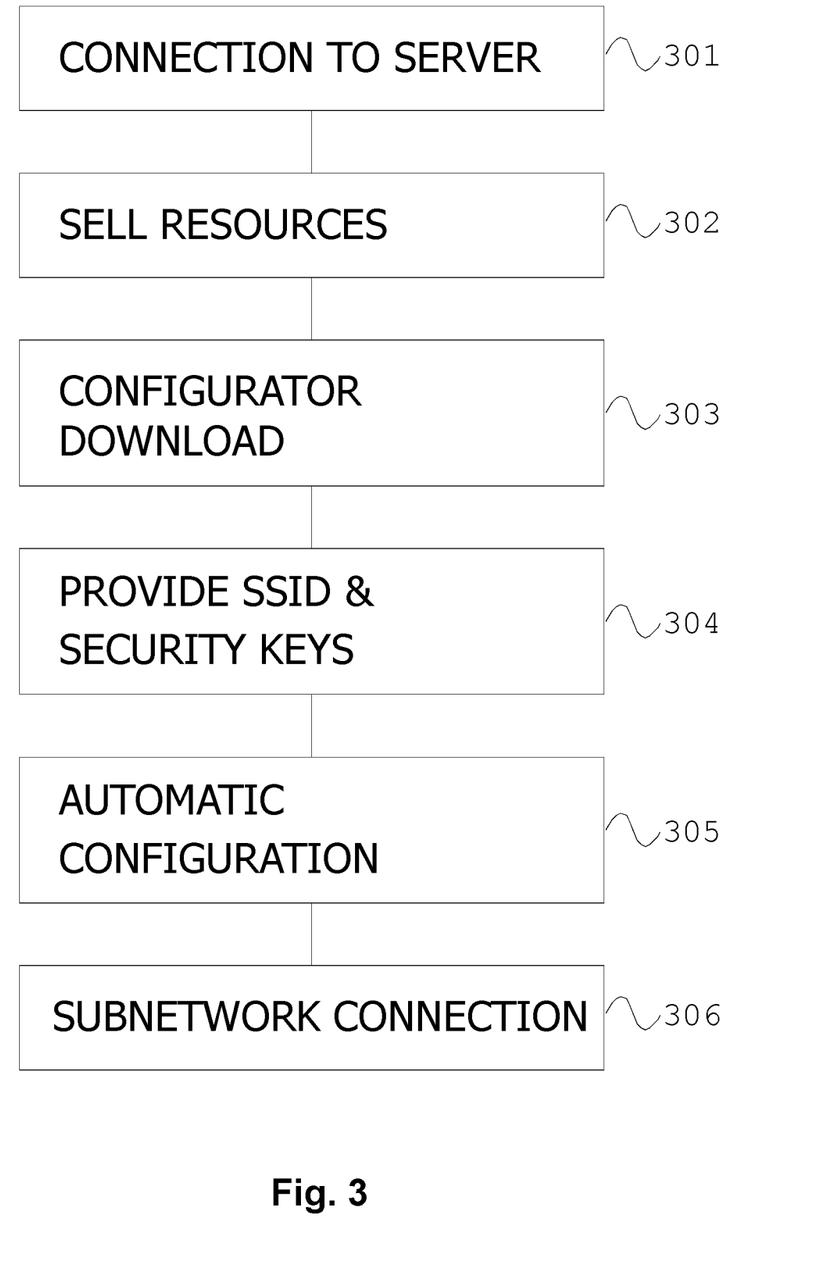
FIG. 3 shows a method with automatic configuration in accordance with an example embodiment.

FIG. 3 shows a flow chart illustrating a method with automatic configuration in accordance with another more detailed example embodiment.

In steps 301 and 302, the end user connects the web page or the like provided by the server 110 and selects a WLAN resource what he/she wants to buy (it is assumed that the server already has information on WLAN resources that it can sell to end users). The dedicated subnetwork is created (if not created beforehand).

In step 303, a piece of software which is here referred to as "configurator" is provided (or in case of a known end user, the end user can already have downloaded it previously) for the end user equipment by the server and installed to it.

In step 304, the installed configurator in the end user equipment accesses the network identification and security information. In certain example embodiments, the network identification and security information are dynamic parameters of the configurator software, in which case the network identification and security information has been delivered to the end user equipment as part of the configurator download. In certain example embodiments, the configurator obtains the information by retrieving it from an email address or from a received SMS. In certain example embodiments, the configurator retrieves the information directly from the server, e.g., from server memory or from a network address which has been configured to the configurator program.

In step 305, the configurator automatically, i.e., without end user interaction, configures the end user equipment to access the subnetwork, and a connection is established via the subnetwork in step 306.

Figure 4:
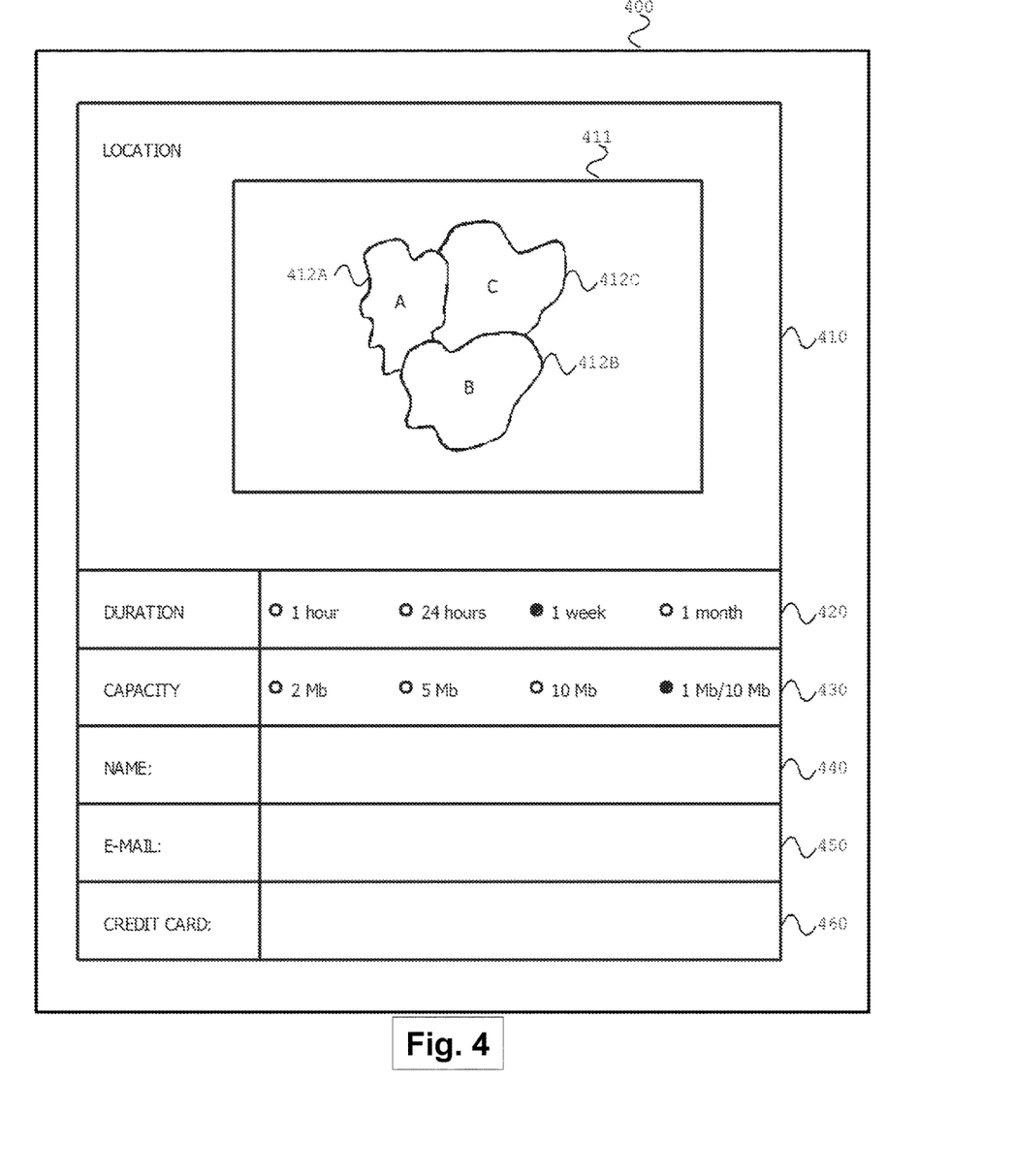
FIG. 4 shows a web page implementation in accordance with an example embodiment.

FIG. 4 shows a web page implementation in accordance with an example embodiment. A web page 400 is generated by the server 110 and can be used to negotiate with end users about available guaranteed WLAN capacity. Accordingly, the web page 400 can be used for the end users to select and buy selected WLAN resource(s).

The web page 400 comprises a location selection window 410 comprising a map 411 for the end user to select the location area (412A, 412B, 412C) for which the resource is bought. Each location area would be typically covered by a single WLAN controller.

The web page 400 further comprises a duration selection window 420 for the end user to select the time how long the resource will be reserved.

The web page 400 further comprises a capacity selection window 430 for the end user to select the bandwidth. The capacity can be the same for uplink and downlink, or it can differ for uplink and downlink. For example, the rightmost button in FIG. 4 illustrates a selection of 1 Mb/s capacity in uplink direction and 10 Mb/s in downlink direction. Instead of in addition to readily predefined capacity in the uplink and downlink direction, the end user can be allowed to more freely select the required capacity thus not being limited to the predefined values.

The web page 400 further comprises a window 440 for the end user to type in the name of the end user/buyer (for a credit card payment), and a window 460 for credit card details.

The web page 400 further comprises a window 450 for the end user to type in an email address of the end user. This email address can be used to deliver the receipt and security details of the subnetwork. The web page may further comprise a window for the end user to type in a phone number. The phone number can then be used to provide the security details by SMS or similar.

The following presents certain further details or variations to the foregoing embodiments:

As to the access points connected to WLAN controllers it can be that one or more than one access point are connected to a WLAN controller. In addition to a part of the total capacity of one or more than one access point under the same WLAN controller also a part of the total capacity of one or more than one access point under a different WLAN controller can be allocated to form the dedicated subnetwork.

In certain example implementations the server provides the end user with the possibility to sell the total capacity of at least one access point, i.e., the whole resource of a selected location area.

In certain example implementations the subnetworks, each defined by different identification information (SSID, virtual ID etc.) with security keys, are predefined so that available resources are allocated ad hoc, e.g., the service provider has pre-created ten 5 Mb/s networks with SSID/virtual ID and security keys that can be offered to end users. If an end user wants to buy less capacity than pre-reserved (e.g., only 2 Mb/s capacity), only the amount of reserved capacity can then be changed, but the same SSID/virtual ID and security keys can be used.

In certain example implementations, at the end of subscription (i.e., when the duration of the provided resource ends) the subnetwork is either deleted, changed to zero capacity, the identification information and/or security information are changed, or the total capacity of the dedicated connection is directed back to the resource selling web page.

Without limiting the scope and interpretation of the patent claims, certain technical effects of one or more of the example embodiments disclosed herein are listed in the following: A technical effect is providing an end user a guaranteed capacity within a WLAN network by forming a subnetwork within the WLAN network. Another technical effect is an automatic configuration of a subnetwork by a downloadable configurator.

It should be noted the some of the functions or method steps discussed in the preceding may be performed in a different order and/or concurrently with each other. Furthermore, one or more of the above-described functions or method steps may be optional or may be combined.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:
1. A method, comprising:
storing, by a server, information relating to one or more wireless local area network (WLAN) resources that are for sale;
receiving, by the server, a first WLAN purchase request from an end user;
providing, by the server, one or more options to the end user that are associated with purchasing the one or more WLAN resources, wherein the one or more options include at least one of one or more geographical locations of the one or more WLAN resources, one or more time durations of the one or more WLAN resources, and one or more bandwidth capacities of the one or more WLAN resources;

receiving, by the server, a second request from the end user to purchase one or more of the one or more WLAN resources, said second request being based on the options provided;

creating one or more subnetworks for sole use of the end user, wherein the one or more subnetworks are within at least one WLAN;

creating subnetwork identification information and subnetwork security information, wherein the subnetwork identification information comprises a service set identifier (SSID) or virtual ID and wherein said subnetwork identification information and subnetwork security information are dedicated to and associated with the created one or more subnetworks; and providing the subnetwork identification information and the subnetwork security information to the end user.

2. The method of claim 1, further comprising:
providing the end user with network identification information and a security key of the one or more created subnetworks.

3. The method of claim 1, further comprising:
negotiating, by the server, with the end user about available guaranteed network capacity.

4. The method of claim 1, further comprising:
setting a quality of service value of the one or more created subnetworks higher in priority than the priority of a quality of service value of best effort traffic in another WLAN.

5. The method of claim 1, wherein the first purchase request additionally identifies a desired location, and wherein the providing the subnetwork information and the security information to the end user further comprises:
providing the end user with a guaranteed capacity at an agreed geographical area.

6. The method of claim 1, further comprising:
providing a part of a total capacity of an access point or a part of a total capacity of a set of access points that are unusable by another end user.

7. The method of claim 1, further comprising:
providing an automatic configuration of an end user device, by a downloadable configurator, to access the one or more created subnetworks.

8. An apparatus, comprising:
storing means for storing information relating to one or more wireless local area network (WLAN) resources that are for sale;
first receiving means for receiving a first WLAN purchase request from an end user;
first providing means for providing one or more options to the end user that are associated with purchasing the one or more WLAN resources, wherein the one or more options include at least one of one or more geographical locations of the one or more WLAN resources, one or more time durations of the one or more WLAN resources, and one or more bandwidth capacities of the one or more WLAN resources;
second receiving means for receiving a second request from the end user to purchase one or more of the one or more WLAN resources, said second request being based on the options provided;
first creating means for creating one or more subnetworks that are for sole use of the end user, wherein the one or more subnetworks are within at least one WLAN;
second creating means for creating subnetwork identification information and subnetwork security information, wherein the subnetwork identification information comprises a service set identifier (SSID) or virtual ID and wherein the subnetwork identification information and the subnetwork security information are dedicated to and associated with the created one or more subnetworks; and
second providing means for providing the subnetwork identification information and the subnetwork security information to the end user.

9. The apparatus of claim 8, wherein the second providing means are configured to provide the end user with network identification information and security information of the one or more created subnetworks.

10. The apparatus of claim 8, further comprising:
negotiating means for negotiating with the end user about available guaranteed network capacity.

11. The apparatus of claim 8, wherein the second providing means set a quality of service value of the one or more created subnetworks higher in priority than the priority of a quality of service value of best effort traffic in another WLAN.

12. The apparatus of claim 8, wherein the second providing means provides an automatic configuration of an end user device, by a downloadable configurator, to access the subnetwork.

13. An apparatus, comprising:
at least one processor; and
at least one memory including computer program code,
the at least one memory and the computer program code configured to, with the at least one processor, cause the apparatus at least to perform:
storing information relating to one or more wireless local area network (WLAN) resources that are for sale;
receiving a first WLAN purchase request from an end user;
providing one or more options to the end user that are associated with purchasing the one or more WLAN resources, wherein the one or more options include at least one of one or more geographical locations of the one or more WLAN resources, one or more time durations of the one or more WLAN resources, and one or more bandwidth capacities of the one or more WLAN resources;
receiving a second request from the end user to purchase one or more of the one or more WLAN resources, said second request being based on the options provided;
creating one or more subnetworks that are for sole use of the end user, wherein the one or more subnetworks are within at least one WLAN;
creating subnetwork identification information and subnetwork security information, wherein the subnetwork identification information comprises a service set identifier (SSID) or virtual ID and wherein the subnetwork identification information and the subnetwork security information are dedicated to and associated with the created one or more subnetworks; and
providing the subnetwork identification information and the subnetwork security information to the end user.

14. The apparatus of claim 13, wherein the at least one memory and computer program code are further configured to provide the end user with network identification information and security information of the one or more created subnetworks.

15. The apparatus of claim 13, wherein the at least one memory and computer program code are configured to cause the apparatus to negotiate with the end user about available guaranteed network capacity.

16. The apparatus of claim 13, wherein the at least one memory and computer program code are configured to cause the apparatus to set a quality of service value of the one or more created subnetworks higher in priority than the priority of a quality of service value of best effort traffic in another WLAN.

17. The apparatus of claim 13, wherein the at least one memory and computer program code are configured to cause the apparatus to provide an automatic configuration of an end user device, by a downloadable configurator, to access the one or more created subnetworks.

* * * * *